(12) United States Patent
DeBerry (10) Patent No.: US 7,306,774 B2
(45) Date of Patent: Dec. 11, 2007

(54) REACTIVE MEMBRANE PROCESS FOR THE REMOVAL OF VAPOR PHASE CONTAMINANTS

(75) Inventor: David W. DeBerry, Austin, TX (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 535 days.

(21) Appl. No.: 10/913,174

(22) Filed: Aug. 5, 2004

(65) Prior Publication Data

US 2006/0029533 A1    Feb. 9, 2006

(51) Int. Cl.
  *B01D 53/50*   (2006.01)
  *B01D 53/56*   (2006.01)
  *B01D 53/64*   (2006.01)
(52) U.S. Cl. .................. 423/210; 423/242.1; 423/235; 423/239.1; 423/532
(58) Field of Classification Search ................ 423/210, 423/242.1, 235, 239.1, 532
  See application file for complete search history.

(56) References Cited

U.S. PATENT DOCUMENTS

| 3,911,080 | A | * | 10/1975 | Mehl et al. .................. 423/210 |
| 5,024,681 | A | | 6/1991 | Chang |
| 5,158,580 | A | | 10/1992 | Chang |
| 5,409,522 | A | * | 4/1995 | Durham et al. ................ 75/670 |
| 5,635,148 | A | * | 6/1997 | Shadman .................... 423/210 |
| 5,827,352 | A | | 10/1998 | Altman et al. |
| 5,854,173 | A | | 12/1998 | Chang et al. |
| 5,948,143 | A | | 9/1999 | Sjostrom et al. |
| 6,136,072 | A | | 10/2000 | Sjostrom et al. |
| 6,136,281 | A | | 10/2000 | Meischen et al. |
| 6,267,940 | B1 | | 7/2001 | Chang et al. |
| 6,468,489 | B1 | | 10/2002 | Chang et al. |
| 6,514,315 | B1 | | 2/2003 | Chang |
| 6,558,454 | B1 | | 5/2003 | Chang et al. |
| 6,695,894 | B2 | | 2/2004 | Chang et al. |
| 6,712,878 | B2 | | 3/2004 | Chang et al. |
| 7,132,090 | B2 | * | 11/2006 | Dziedzic et al. ............ 423/230 |

* cited by examiner

*Primary Examiner*—Timothy C. Vanoy
(74) *Attorney, Agent, or Firm*—Morgan, Lewis & Bockius LLP (57) ABSTRACT

Generally, the present invention provides a method and apparatus for removing a vapor phase contaminant from a gas stream, thereby reducing the concentration of the vapor phase contaminant in the gas stream. In one embodiment, the present invention provides a method for removing a vapor phase contaminant from a gas stream, comprising contacting a gas stream comprising a vapor phase contaminant with a first side of a membrane; sorbing the vapor phase contaminant using the membrane; reacting the vapor phase contaminant into an reacted form of the vapor phase contaminant; transporting the reacted form of the vapor phase contaminant through the membrane to a second side of the membrane; contacting the second side of the membrane with a liquid; and dissolving the reacted form of the vapor phase contaminant into the liquid. Methods for making a membrane comprising a metal for use in the present invention is also described.

28 Claims, 8 Drawing Sheets

REACTIVE MEMBRANE PROCESS FOR THE REMOVAL OF VAPOR PHASE CONTAMINANTS

BACKGROUND OF THE INVENTION

1. Field of the Invention

The present invention relates to a method and apparatus for removing vapor phase contaminants from a gas stream. More particularly, the present invention relates to a method and apparatus for the removal of vapor phase contaminants from flue gases generated by a coal-fired boiler using a membrane.

2. Description of Related Art

Utility power plants are concerned about emissions of trace metals in light of the 1990 Clean Air Act Amendment (CAAA) on air toxics (Title III). Special attention has been given to mercury (Hg) in terms of its environmental release and impacts, and the Environmental Protection Agency (EPA) is closely scrutinizing sources that emit mercury. The EPA has determined that utility power plants, and specifically coal-fired power plants, are the major remaining source of mercury emissions into the air. Mercury is present in flue gas generated by coal-fired power plants in very low concentrations (<5 ppb) and forms a number of volatile compounds that are difficult to remove. Specially designed and costly emissions-control systems are required to capture these trace amounts of volatile compounds effectively.

Several approaches have been adopted for removing mercury from gas streams. The most common methods are often called "fixed-bed" techniques. In these systems, the gas containing mercury is passed through a bed consisting of sorbent particles held in place by various structures such as honeycombs, screens or fibers. A common sorbent is activated carbon in powder form.

There are, however, several disadvantages of fixed bed systems. Gas streams such as those from power plant coal combustion contain significant fly ash that can plug the bed structures and, thus, the beds need to be removed frequently from operation for cleaning. Alternatively, these beds may be located downstream of a separate particulate collector (see, for example, U.S. Pat. No. 5,409,522, entitled "Mercury Removal Apparatus and Method," which is incorporated by reference herein in its entirety). Particulate removal devices ensure that components of the flue gas such as fly ash are removed before the gas passes over the mercury removal device. The beds will still need to be taken off-line periodically for regeneration, thereby necessitating a second bed that can remain on-line while the first one is regenerating. These beds also require significant space and are very difficult to retrofit into existing systems such as into the ductwork of power plants without major modifications.

In another process for removing mercury or other vapor phase contaminants from a flue gas stream, a carbonaceous starting material is injected into a gas duct upstream of a particulate collection device. The carbonaceous starting material is activated in-situ and adsorbs the contaminants. The activated material having the adsorbed contaminants is then collected in a particulate collection device. Such a process is described in U.S. Pat. Nos. 6,451,094 and 6,558,454, both entitled "Method for Removal of Vapor Phase Contaminants From a Gas Stream by In-Situ Activation of Carbon-Based Sorbents," which are both incorporated by reference herein in their entireties. However, the need to replenish the carbonaceous starting material and collect the spent activated material in a particulate collection device creates extra steps that consume additional resources.

In yet another process to remove mercury in a flue gas stream, gold and/or metals from Groups IA, IB, and III of the Periodic Table of Elements can be used as a sorbent to adsorb mercury, as described in U.S. Pat. No. 5,409,522, entitled "Mercury Removal Apparatus and Method," which is incorporated by reference herein in its entirety. In this process, mercury is adsorbed and amalgamated with the sorbent that is disposed on a collection surface. The sorbent can be regenerated by applying heat to the sorbent surface, thereby releasing the mercury-containing compound. Even though the sorbent can be regenerated to save costs, the regeneration process creates an extra step that consumes time and other resources to set up and maintain.

Elemental mercury is particularly difficult to remove by these conventional methods. To address this difficulty, gold and/or other noble metals may be used as a catalyst to convert elemental mercury (Hg(0)) into an oxidized form, such as mercury (II) chloride, since oxidized forms are easier to remove. Oxidation of mercury through gold and/or other noble metals is possible when handling flue gas streams containing at least 20 ppm HCl gas. The gold and/or noble metal may be disposed on a catalyst bed supported by a screen in a duct. Such a process is described in U.S. Pat. No. 6,136,281, entitled "Method to Control Mercury Emissions from Exhaust Gases," which is incorporated by reference herein in its entirety.

In view of the foregoing, there exists a need for an improved method and apparatus for removing vapor phase contaminants such as mercury from a gas stream.

SUMMARY OF THE INVENTION

Generally, the present invention provides a method and apparatus for removing a vapor phase contaminant from a gas stream, thereby reducing the concentration of the vapor phase contaminant in the gas stream. In one embodiment, the present invention provides a method for removing a vapor phase contaminant from a gas stream, comprising contacting a gas stream comprising a vapor phase contaminant with a first side of a membrane; sorbing the vapor phase contaminant using the membrane; reacting the vapor phase contaminant into an reacted form of the vapor phase contaminant; transporting the reacted form of the vapor phase contaminant through the membrane to a second side of the membrane; contacting the second side of the membrane with a liquid; and dissolving the reacted form of the vapor phase contaminant into the liquid. In some embodiments, the reaction comprises oxidation of the vapor phase contaminant, such as mercury or sulfur oxides, including, for example, sulfur dioxide. In another embodiment, the reaction comprises reducing the vapor phase contaminant, such as NO.

In another embodiment, the present invention provides an apparatus for removing a vapor phase contaminant from a gas stream flowing in a gas duct, comprising a membrane disposed within a gas duct and a container configured to hold a liquid adjacent to a first side of the membrane. The membrane can be made of polymer, including perfluorinated polymers such as TEFLON® or NAFION®. The membrane may also comprise of a metal selected from a group consisting of gold, silver, palladium, platinum, copper, nickel and mixtures thereof. The membrane may also comprise of a Group VI element, such as selenium.

In yet another embodiment, the present invention provides a method for producing a metallized membrane, comprising contacting a first side of a polymer membrane with a first solution comprising a metal; contacting a second, opposite side of the polymer membrane with a second solution comprising a reducing solution; and passing the reducing solution through the polymer membrane, thereby reducing the first solution and depositing the metal on the first side of the polymer membrane.

DETAILED DESCRIPTION OF THE INVENTION

Generally, the present invention provides a method and apparatus for removing a vapor phase contaminant or multiple vapor phase contaminants from a gas stream, thereby reducing their concentration in the gas stream. In one embodiment, the present invention provides a method and apparatus for reducing the concentration of vapor phase contaminants such as mercury, sulfur oxides, including, for example, sulfur dioxide, and nitrogen oxides, such as NO, in a flue gas stream from a coal-fired power plant boiler. Generally, the method and apparatus of the present invention utilize a membrane wherein the vapor phase contaminant is sorbed by the membrane; reacted or chemically converted, if necessary, into a reacted or predetermined form, such as a soluble form; transported through the membrane to the opposite side of the membrane; and dissolved into a liquid stream in contact with that side of the membrane, wherein the liquid stream may be subsequently treated to remove the dissolved contaminant.

The following text in connection with the Figures describes various embodiments of the present invention. It should be appreciated that where the same numbers are used in different Figures, these numbers refer to the same element or structure throughout. The following description, however, is not intended to limit the scope of the present invention.

Figure 1:
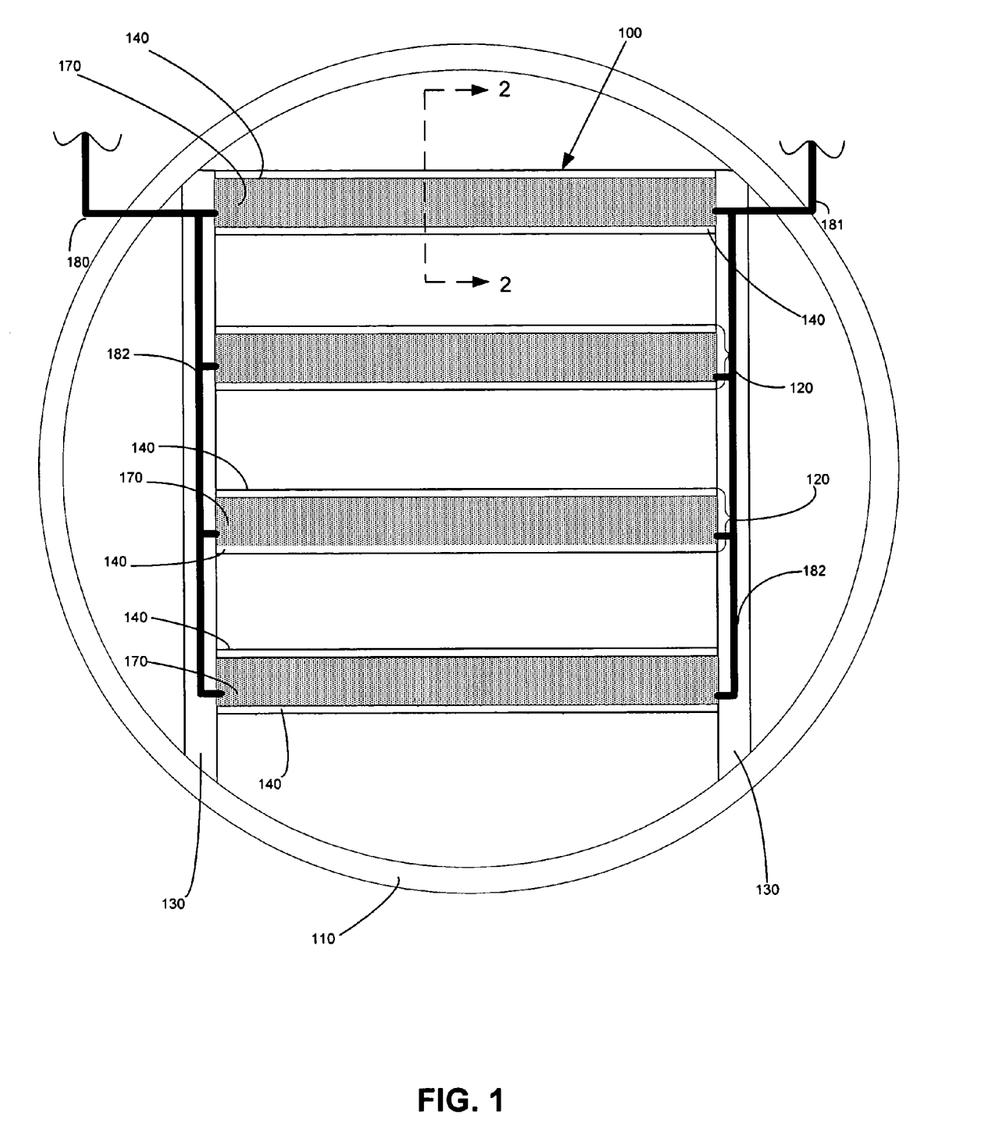
FIG. 1 is a cross-sectional view of one embodiment of the present invention.

FIG. 1 is a cross-sectional view of one embodiment of the present invention. Specifically, FIG. 1 is a cross-sectional view of a membrane removal system 100 disposed within a gas duct 110, wherein the gas flow is normal to the page. The membrane removal system 100 comprises a plurality of membrane units 120 that are held in place by a support structure 130. Each membrane unit 120 comprises a pair of membranes 140 and a pair of end plates 240 (shown in FIG. 2) that form a liquid-tight region 170 between each pair of membranes 140. This region 170 is configured to hold a liquid between the membranes 140 during operation, wherein the liquid may be stationary or may be flowing. In this particular embodiment, the membrane units 120 and the membranes 140 are oriented horizontally; however, they may also be oriented vertically. In either case, the membranes 140 are substantially flat and may extend for any desired length along the length of the duct 110 (i.e., the membranes extend in a direction normal to the page and in the same direction as the gas flow through the duct 110). It should be appreciated that the overall dimensions of the membrane 140 will dictate the total surface area of the membrane 140 available for contact with the gas stream that flows over the membrane surface. Therefore, depending upon the particular vapor phase contaminant to be removed and its concentration, the gas flow rate and other process conditions, such as temperature and humidity, the overall size of the membrane 140 can be determined. The space between the membranes that defines the region 170 that holds the liquid is discussed below in connection with FIG. 5.

The support structure 130 is configured to hold the membranes 140 in place and substantially flat during operation. Further, the support structure 130 may be configured to provide a liquid-tight seal along the length of each of the membrane units 120 and at each of the ends of each of the membrane units 120 so that the liquid held in the region 170 between each pair of membranes 140 does not leak into the gas stream. Alternatively, each membrane unit 120 may be surrounded at its perimeter by a frame that is configured to hold each pair of membranes 140 in place and that maintains a liquid-tight seal around the perimeter of the membrane unit 120. In this case, each membrane unit 120 may be separately placed into the support structure 130, which may simply be a rack configured to hold the desired number of membrane units 120 with the desired spacing between each membrane unit 120.

Connected to the support structure 130 is a pair of tubes or pipes 180, 181 that are configured, respectively, to deliver and remove a liquid to and from each region 170 between each pair of membranes 140. In one embodiment, the pipes 180, 181 may each be connected to a corresponding header 182 that is common to each region 170 between each pair of membranes 140. Alternatively, a separate pair of tubes or pipes that connect individually to each region 170 between each pair of membranes and that each extend outside of the duct 110 may be used (not shown).

These pipes 180, 181 extend outside of the duct 110 and may be separately connected to external tanks (not shown): one tank for collection of spent liquid from the membrane units 120 and a second tank holding regenerated or fresh liquid that is pumped to the region 170 between each pair of membranes 140. The system for removing spent liquid from the membrane units 120 and for feeding fresh liquid to the membrane units 120 may be controlled by various flow control electronics (not shown). For example, flow control techniques may be utilized to feed liquid at different rates to each of the membrane units 120, depending upon the amount of vapor phase contaminant that is removed from the gas by each membrane unit 120.

It should be appreciated that the membrane removal system 100 shown in FIG. 1 is not drawn to scale. As discussed below, the membrane units 120 may be much smaller in size relative to the diameter of the duct 110. For example, the thickness of each membrane unit 120 may be significantly smaller than shown. As a result, any number of membrane units 120 may be used or placed adjacent to one another in the membrane removal system 100, depending upon the effect on the pressure drop of the gas flow through the duct 110. Additionally, the spacing between each membrane unit 120 may be altered. For example, relatively more membrane units 120 will result in less space between each of them, thereby increasing the pressure drop but providing a greater amount of membrane surface area available to contact the gas and sorb the vapor phase contaminant. Alternatively, where process conditions dictate a given gas flow requirement, the number of membrane units used can be reduced. Moreover the length of each membrane may be increased to maintain a given contact area with the gas, as opposed to increasing the number of membrane units in the duct. It should also be appreciated that multiple membrane removal systems 100, each having multiple membrane units 120 may be placed within the duct 110 in series.

Specifically in the context of removing vapor phase contaminants, including, for example, mercury present in the flue gas of a coal-fired power plant, it should be appreciated that the location of the membrane removal system 100 within the duct 110 or along the flue gas path can be altered. Depending on the vapor phase contaminant to be removed, the composition of the membrane and composition of the liquid in the membrane units 120, there may also be a temperature effect on the sorption of the vapor phase contaminant. As will be discussed below in connection with mercury removal, gold-metallized membranes may be used with a solution of nitric acid as the liquid between each pair of membranes. In this case, the membrane removal system 100 should be positioned where the ambient temperature is not much higher than approximately 200° F., such as downstream of a wet flue gas desulfurization system if present. In one embodiment for mercury removal, the membrane removal system 100 would operate at an ambient temperature range of approximately 100-150° F. It should be appreciated that the temperature of the gas should be taken into account when selecting the membrane composition to ensure that the membrane is capable of withstanding the gas temperature.

Furthermore, the placement of the membrane system 100 may also be influenced by the particulate loading or fly ash in the gas stream, such as the flue gas from a coal-fired power plant boiler. For the membrane removal system 100 to function as desired, the membrane surfaces should not be overloaded with particulate. Therefore, the membrane removal system 100 should be placed in a location where the gas has a low particulate concentration, such as downstream of a particulate collection device or a scrubber.

Figure 2A:
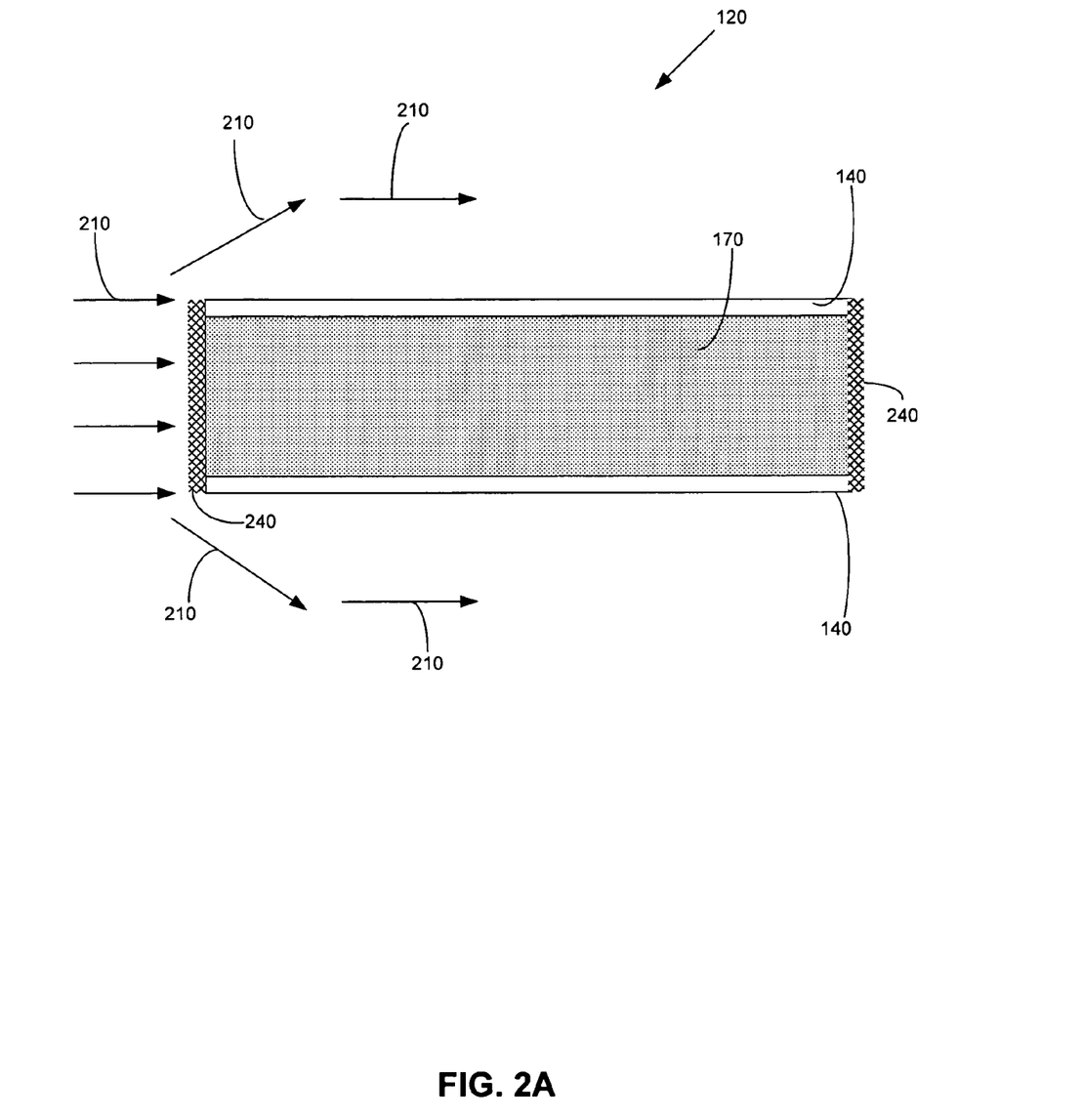
FIG. 2A is a plan view of the embodiment of a membrane unit of FIG. 1 taken along line 2-2 of FIG. 1.

FIG. 2A is a plan view of the embodiment of a membrane unit of FIG. 1 taken along line 2-2 of FIG. 1. FIG. 2 illustrates a single membrane unit 120 comprising a pair of membranes 140 and a liquid-tight region 170 between them, where the flue gas stream 210 flows over and under the membranes 140. A pair of end plates 240 are shown, which are configured to hold the membranes in place and to provide a liquid-tight seal at the ends of the membrane unit 120. In this case, once the membrane unit 120 is positioned within the support structure 130, that support structure 130 provides a liquid-tight seal along the length of the membrane unit 120. It should be appreciated that the end plates 240, while shown as flat, may be aerodynamically designed so as to minimize the disruption of the gas flow upon impacting the membrane unit 120 and to maximize gas contact with the surfaces of the membranes 140. For example, the end plates 240 may be designed to effect an appropriate amount of gas flow turbulence to maximize contact between the bulk gas and the membrane surface as the gas passes over the membrane surface. As discussed above, a frame that extends about the entire perimeter of the membrane unit 120 may alternatively be used to hold the membranes 140 in place in the membrane unit 120 and to provide a liquid-tight seal around the entire membrane unit 120. It should be appreciated that any other structure or material may be used to provide a liquid-tight seal around the perimeter of the region 170 between each pair of membranes 140, provided such is compatible with the gas environment and the liquid to be held between the membranes 140.

Figure 2B:
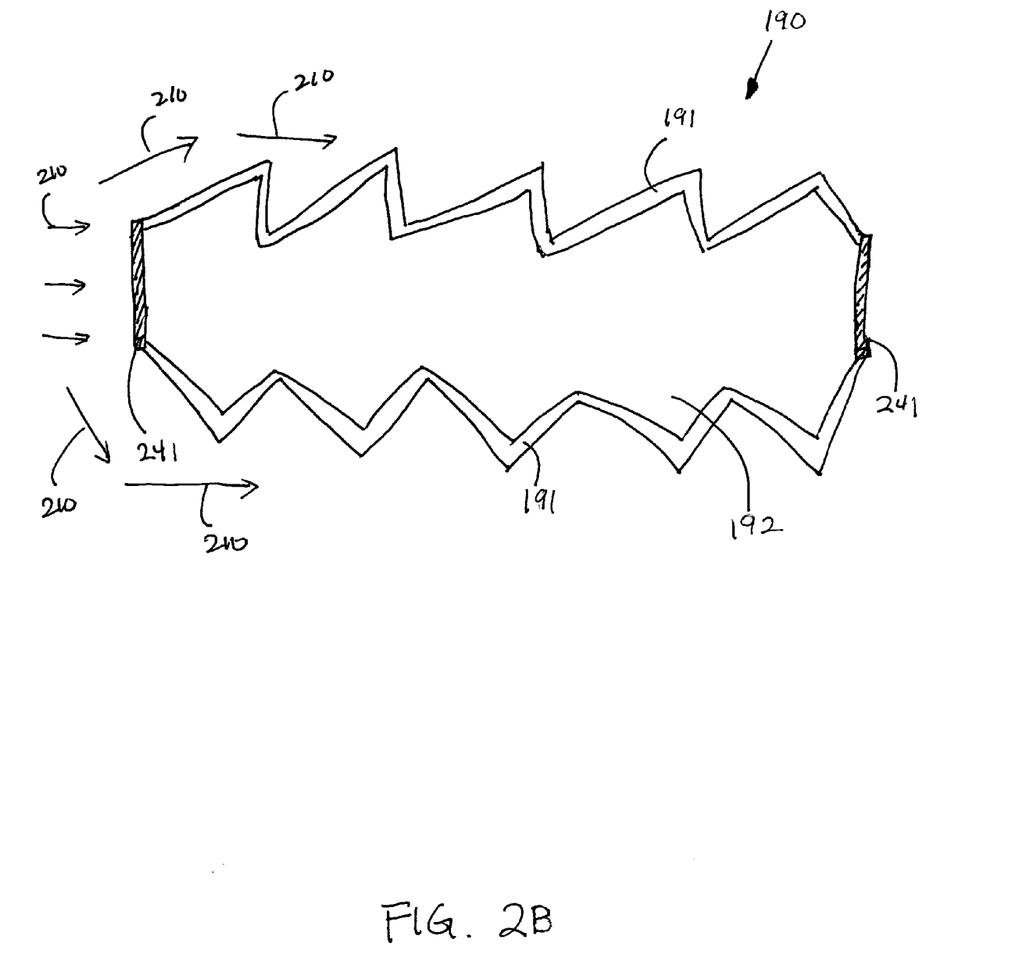
FIG. 2B is a plan view of another embodiment of a membrane unit.

FIG. 2B is a plan view of another embodiment of a membrane unit. In this embodiment, the membrane unit 190 comprises a pair of membranes 191 and a liquid-tight region 192 between them, in which the membranes 140 are folded in an accordion-like fashion to provide additional contact surface area. A pair of end plates 241 are used to hold the membranes 191 in place and to provide a liquid-tight seal at the ends of the membrane unit 190. Similarly to the membrane unit described in connection with FIG. 2A, this membrane unit 190 may also be used with a frame that provides a liquid-tight seal around its perimeter or may rely upon the support structure to provide a liquid-tight seal along its length. This membrane unit 190 may be configured in a membrane removal system in a manner similar to that described in connection with FIGS. 1 and 2A.

Figure 2C:
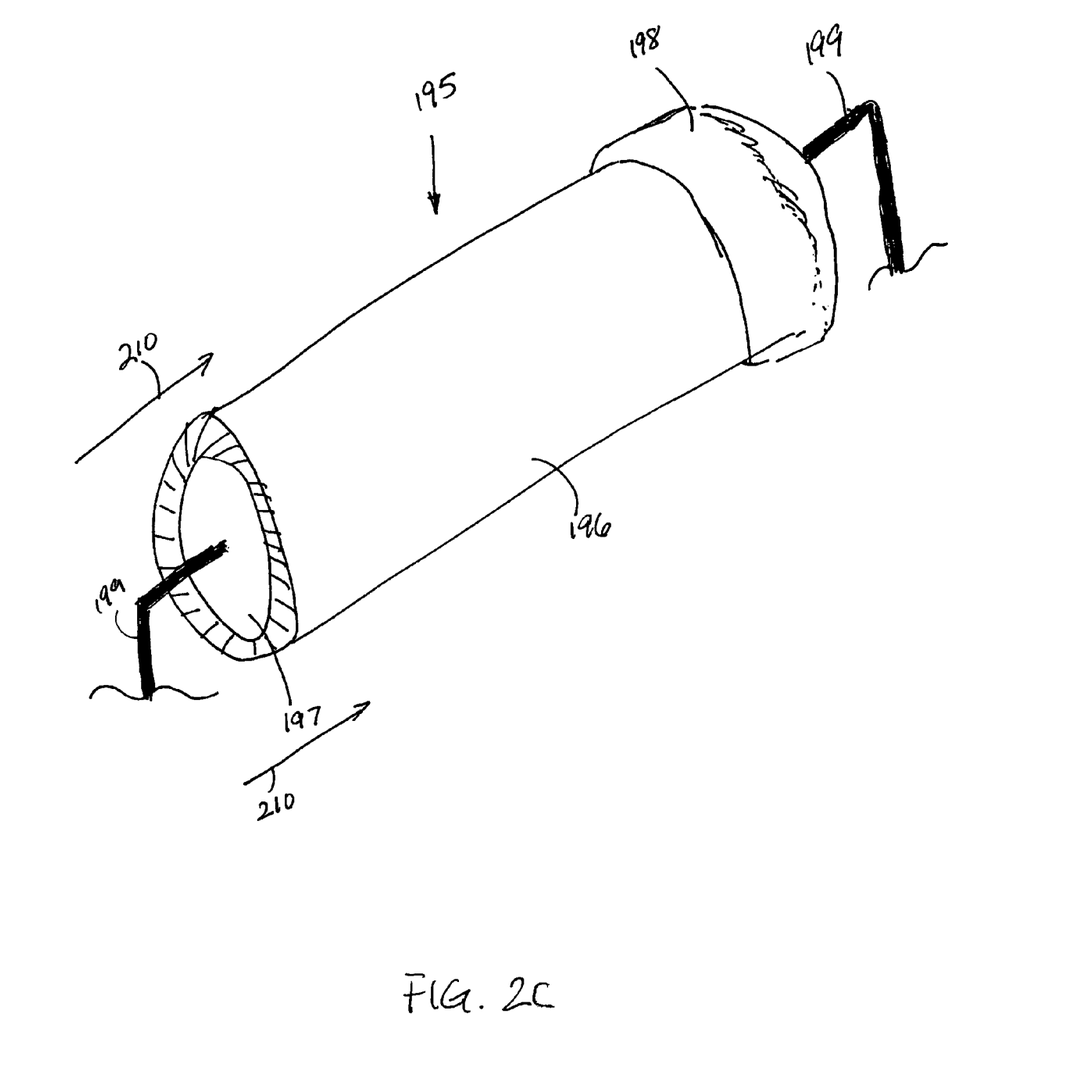
FIG. 2C is a plan view of yet another embodiment of a membrane unit.

FIG. 2C is a plan view of yet another embodiment of a membrane unit. In this embodiment, the tubular membrane unit 195 comprises a tubular membrane 196 that defines a cylindrical space 197 to hold a liquid. A pair of end caps 198 may be used to provide a liquid-tight seal at each end of the tubular membrane 196. Each end cap may be connected to a pipe or tube 199 through which liquid may flow. In operation, a plurality of these tubular membrane units may be positioned parallel to one another in a structural support in a gas duct in any matrix arrangement desired. As shown, the tubular membrane units 195 can be oriented with their length parallel to the gas flow 210. Depending upon the operating conditions, the liquid flow through the tubular membrane 196 may be co-current or counter-current to the gas flow 210.

In general, the membranes 140 are preferably polymer membranes. The polymer material should be selected based upon the vapor phase contaminant being removed. For example, the porosity or permeability of the membrane should capable of allowing the sorbed vapor phase contaminant, or any chemically altered form thereof, to be collected on or into the membrane and to pass through the membrane to the other side. Further, in some cases, it may be desirable to have the liquid that is held in the region 170 between the membranes to permeate into the membrane, either partially or completely to the surface of the membrane, to assist with the sorption process. Therefore, the permeability of the membrane to the liquid that will be used in operation is also a consideration. The overall gas conditions to which the polymer material will be exposed, such as temperature, corrosivity, acidity and the presence of other gas components that may deleteriously affect the membrane integrity or performance, should also be taken into account in selecting the polymer material.

In one embodiment, the polymer membrane may comprise a permeable ion exchange membrane. Depending on the type of species to be removed from the gas stream, the polymer membrane may comprise either a permeable anion or a cation exchange membrane. With respect to mercury removal, the polymer membrane may comprise a permeable cation exchange membrane because cationic forms of mercury are removed by the membrane removal system, as will be further described in connection with FIG. 5. In connection with the removal of sulfur oxides and nitrogen oxides, an anion exchange membrane may be used; however a cation exchange membrane may be used as well. Since ionic species may be formed upon the sorption of a vapor phase contaminant, the polymer membrane should also function as a solid polymer electrolyte in connection with the liquid occupied in the region between the membranes.

In one embodiment, the membrane may comprise a perfluorinated polymer, such as DuPont's TEFLON®. In another embodiment, the polymer membrane comprises a perfluorinated polymer with an anionic functional group, such as sulfonic acid and carboxylic acid groups. For example DuPont's NAFION® is a perfluorinated polymer with sulfonic acid functional groups. NAFION® has good chemical and thermal stability and an inherent ability to act as a strong acid cation exchange material for sorbing such vapor phase contaminants such as mercury. Additionally, polymer membranes made of composites, such as a NAFION® and TEFLON® composite, may be used as well. Such membranes may also be used for removing sulfur and nitrogen oxides.

The thickness of the polymer membrane may vary. The polymer membrane should be sufficiently thin to facilitate movement of the sorbed contaminant, or any chemically altered form thereof, but should also be of sufficient structural integrity when exposed to the gas flow. A membrane having a thickness of approximately 0.2 mm may be adequate for many applications, including, for example, use in a coal-fired boiler flue gas.

In another embodiment, the membrane 140 comprises a metallized membrane that can be used to assist with the sorption and chemical reaction or conversion of a given vapor phase contaminant once it is sorbed by the membrane to its desired reacted form. The metallized membrane may comprise a metal layer disposed on its surface, which can be very thin, such as less than three microns. Alternatively, or in combination with the metal layer, the metallized membrane may comprise metal particles impregnated into the membrane rather than being simply disposed on the top surface of the membrane. The formation of a metallized membrane is described below in connection with FIGS. 3 and 4.

The metal used can be selected from a variety of metals depending on the type of vapor phase contaminant to be removed. For example, for some vapor phase contaminants, such as elemental mercury, it may be desirable to chemically convert the sorbed vapor phase contaminant to another form, in which case, the metal may act as a catalyst for this reaction. For example, it is desirable to oxidize sorbed mercury to an oxidized form since it is more easily dissolved in the liquid on the other side of the membrane. In this case, the ability of the metal to act as a catalyst in the oxidation process should be taken into account. For example, gold, silver, palladium, platinum, copper, nickel and mixtures thereof can be used when the vapor phase contaminant is mercury. With respect to elemental mercury removal, gold is a preferred metal because of mercury's affinity to gold and gold's ability to act as a catalyst in oxidizing elemental mercury.

Similarly, it may be desirable to oxidize sulfur dioxide into sulfuric acid, which may be readily dissolved into the liquid between the membranes. Ferric ion or manganese ion may be used as a metal catalyst for oxidizing sulfur dioxide and may be incorporated into the membrane through the use of a ferric salt, such as ferric chloride or ferric sulfate, or through the use of a manganese salt, such as manganese sulfate or manganese chloride, respectively. With respect to NO, it may be desirable to reduce the NO using dichromate or permanganate or by using a complexing/reducing agent such as ferrous ethylenediaminetetraacetic acid (ferrous EDTA).

It should be appreciated that other species may be incorporated into the membrane similarly to the above described metals. For example, Group VI elements may be used. Specifically, selenium may be used for mercury oxidation. (It should be appreciated that all references to "metal," "metal layer," or "metallization" also encompass such other species that may be incorporated into the membrane, such as Group VI elements, such as selenium.) It should be appreciated that carbon or activated carbon may also be disposed on a membrane surface or within a membrane to which vapor phase contaminants such as mercury may adsorb.

FIG. 3 is a flowchart of a method to produce a metallized membrane according to one embodiment of the present invention. Specifically, FIG. 3 illustrates a manufacturing process 300 for producing a metallized membrane in which a metal layer is formed on the membrane surface.

Figure 3A:
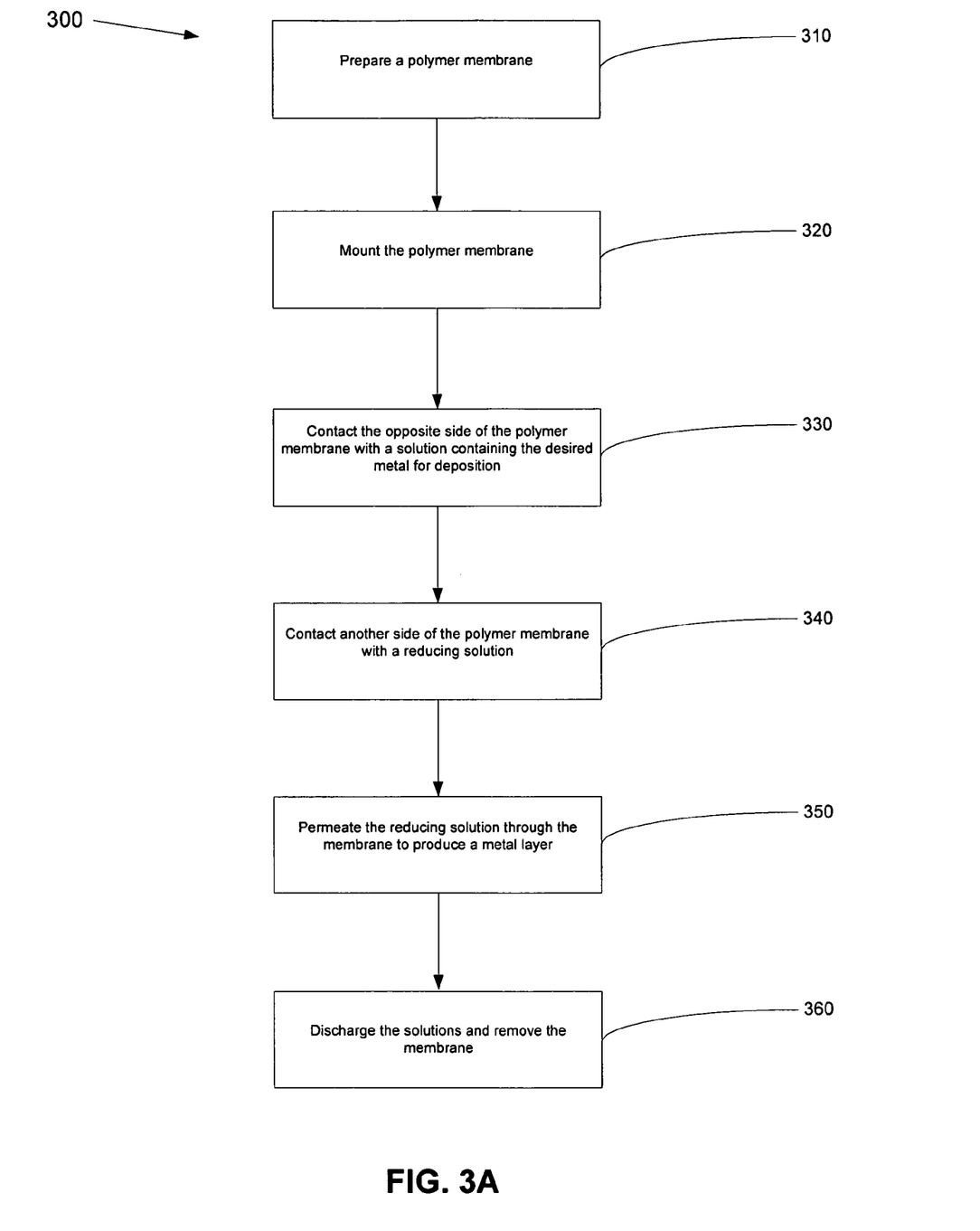
FIG. 3A is a flowchart of a method to produce a metallized membrane according to one embodiment of the present invention.

In a first step 310, a polymer membrane is prepared so that the metal layer adheres to the polymer membrane's surface. In one embodiment, the polymer membrane's surface is abraded to improve subsequent adhesion of the metal layer to that surface. This preparation step 310 may also optionally comprise boiling the polymer membrane in an approximate 6 M nitric acid solution for approximately one hour, followed by boiling in deionized water for approximately one hour. It should be appreciated that depending upon the specific polymer membrane used, the concentration of the nitric acid and the boiling times may be altered.

In a second step 320, the polymer membrane is mounted in a holder configured to separately hold two liquids, one on each side of the membrane. Depending on the size and geometry of the polymer membrane, the holder can be of any suitable size and geometry that can house the polymer membrane. The holder can range from a filter holder to a customized tank configured to receive a membrane that fluidly separates the tank into two compartments.

Figure 3B:
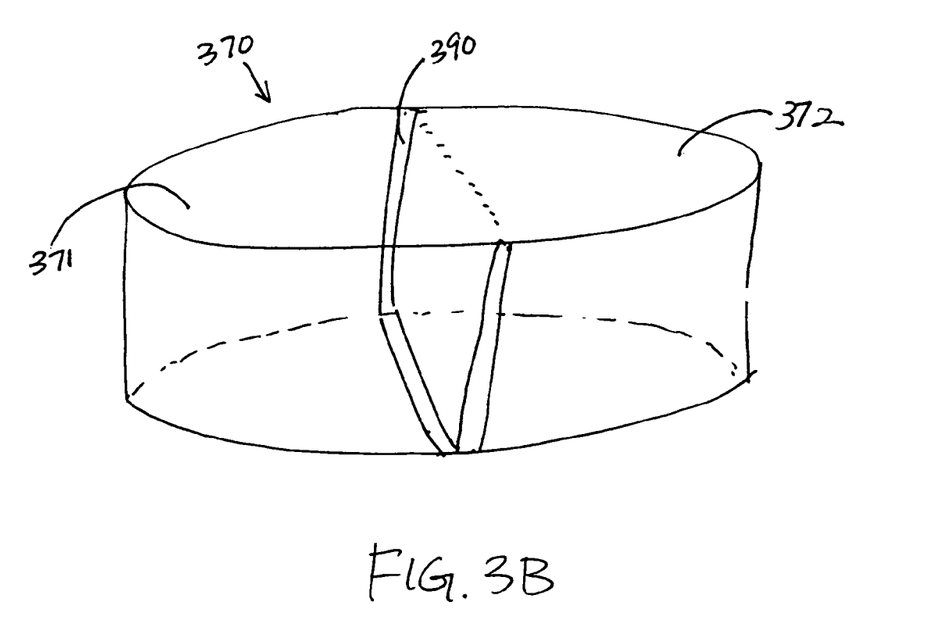
FIG. 3B is a perspective view of a tank used in the method of FIG. 3A.
Figure 3C:
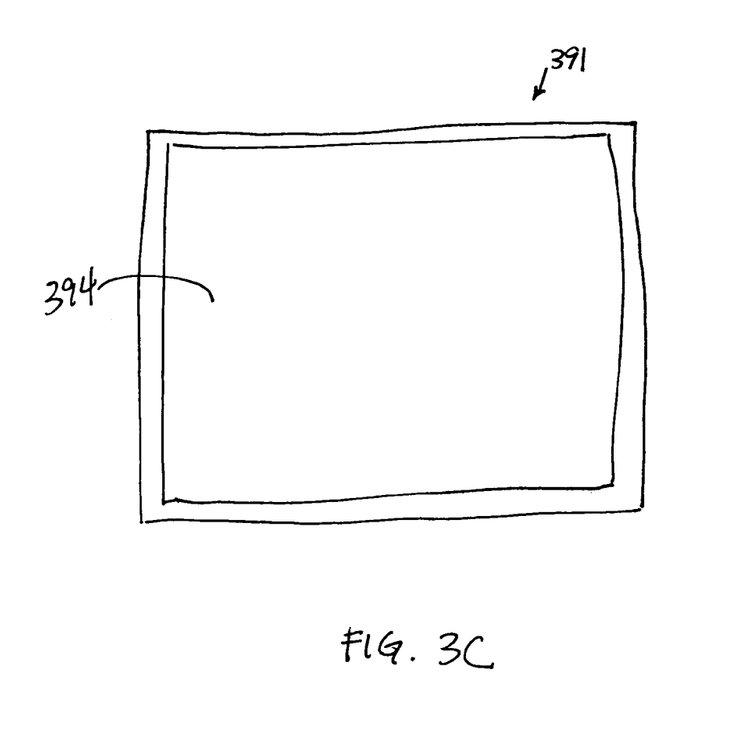
FIG. 3C is a top view of a frame that may be used in connection with the tank of FIG. 3B.

FIG. 3B is a perspective view of a tank used in the method of FIG. 3A. The tank 370 comprises a slot 390 configured to hold a membrane and to fluidly separate the tank 370 into two compartments 371, 372. FIG. 3C is a top view of a frame that may be used in connection with the tank of FIG. 3B. The frame 391 may be used to hold the membrane 394 in a structurally sound position. The slot 390 may be configured to receive the frame 391 such that the frame mates with the inside walls of the tank to fluidly separate the two compartments 371, 372. The tank 370 may also comprise a top or lid (not shown). In another embodiment, the tank may be configured with a built-in gasket that separates the tank into two compartments and into which the membrane may be placed, without the need for a separate frame. This tank may also comprise a top or lid with a corresponding gasket that mates with the top or exposed edge of the membrane. The holder should also have liquid inlet and drainage controls and should be made of a material compatible with the liquids to be held.

In a third step 330, a first liquid is fed into one compartment of the holder, thereby contacting one side of the polymer membrane. This first liquid comprises a chemical compound that has some form of the desired metal to be deposited on the side of the membrane, which will become the metallized surface. The form of the metal in this first liquid may be, for example, a reducible metal salt of the desired metal. In one embodiment, this first liquid comprises a hydrogen tetrachloroaurate ($HAuCl_4$) solution to facilitate the deposition of a gold layer on the membrane, specifically an approximately 0.02 M HAuCl$_4$ solution. As mentioned earlier, a gold-metallized membrane is preferred for mercury removal. In an alternative embodiment in which the resulting metal layer comprises palladium, the first liquid comprises a palladium chloride solution. In another alternative embodiment in which the resulting metal layer comprises selenium, the first liquid comprises a potassium selenocyanate solution (KSeCN). Further, a ferric salt, such as ferric chloride or ferric sulfate, may be used to generate a membrane comprising ferric ion, and a manganese salt, such as manganese sulfate or manganese chloride, may be used to generate a membrane comprising manganese ion. In addition, dichromate or permanganate or a complexing/reducing agent such as ferrous ethylenediaminetetraacetic acid (ferrous EDTA) may be incorporated into the membrane in a similar fashion.

In a fourth step 340, a second liquid is fed into the second compartment of the holder, thereby contacting the other side of the polymer membrane. This second liquid comprises a chemical compound that can reduce the chemical compound of the first liquid described in the third step 330. It should be appreciated that the side of the membrane that is contacted by this second liquid will not have a metal layer disposed thereon. In the embodiment where the first liquid comprises a hydrogen tetrachloroaurate (HAuCl$_4$) solution, the second liquid may comprise an approximately 0.02 M hydrazine solution, in which the hydrazine solution would permeate across the polymer membrane to reduce the hydrogen tetrachloroaurate solution on the other side of the polymer membrane, thereby producing a gold layer on the membrane surface that is in contact with the first liquid. It should be appreciated that improved gold layer formation may occur through the addition of a salt, such as sodium sulfate, to the hydrazine solution. In the embodiment where the first liquid comprises a palladium chloride solution, the second liquid may also be an approximately 0.2 M hydrazine solution. In the embodiment where the first liquid comprises a potassium selenocyanate solution (KSeCN), the second liquid may be any acidic solution, such as HCl, that would acidify the potassium selenocyanate solution.

In a fifth step 350, the second liquid permeates through the polymer membrane, which reduces the first liquid, thereby forming a thin metallic layer on the polymer membrane. Permeation of the second liquid occurs over a period of time, ranging from approximately 20 minutes to approximately 20 hours after the polymer membrane has been exposed to the two liquids. The permeation time may be reduced by circulating the second liquid, rather than leaving it stagnant. Furthermore, the chemistry of the second liquid may also affect permeation time. It should be appreciated that while this process results in a metal layer primarily on the surface of the membrane, metal may also be deposited within the membrane. The extent to which the metal is deposited within the membrane and below the surface of the membrane depends upon the permeability of the membrane to the metal species in the solution, the temperature, and the amount of time that the two liquids are in contact with the membrane.

In the final step 360, the solutions are discharged from the holder and the membrane is removed. At this point, the membrane is ready for use. It should be appreciated that in the embodiment where a frame is used to hold the membrane in the tank, this same frame may be used as the frame that holds the membrane in the membrane removal system or the structural support for the membrane units.

In the case of producing a gold-metallized polymer membrane with hydrogen tetrachloroaurate and hydrazine according to the process 300 described in FIG. 3, the gold in the hydrogen tetrachloroaurate solution as described above should be nearly all consumed, which would naturally complete the process 300 because no more metallization can occur after the gold in the hydrogen tetrachloroaurate has been consumed. One way to detect the consumption of gold in hydrogen tetrachloroaurate is based on the color of the hydrogen tetrachloroaurate solution, which is transformed from yellow to colorless as the gold is deposited on the membrane. Moreover, the resulting metal layer appears as a matte gold surface on the metallized side of the polymer membrane. It should be appreciated that other metals or species may be incorporated into the membrane using this process.

It should also be appreciated that one of skill in the art can implement other methods of metal deposition, when producing a metallized membrane. For example, spray coating, spin coating, sputtering and electrolytic deposition processes can be used to create a metal layer on a given side of a polymer membrane. However, without being limited by theory, it is believed that the chemical reaction that occurs during the process 300 described in FIG. 3 produces small metal particles on the membrane, which is more desirable for the purposes of the present invention because the small particle size may provide more effective surface area for sorbing the vapor phase contaminant.

Figure 4:
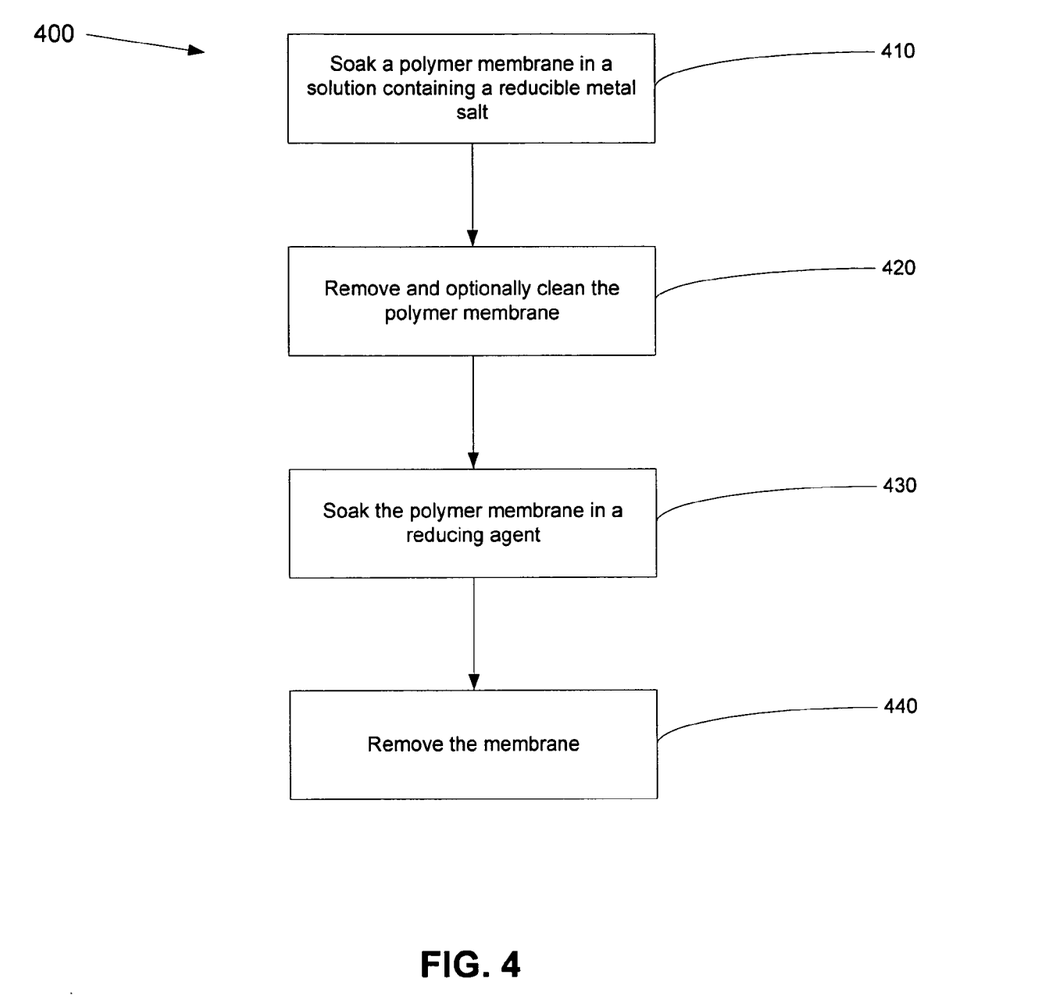
FIG. 4 is a flowchart of a method to produce a metallized membrane according to another embodiment of the present invention.

FIG. 4 is a flowchart of a method to produce a metallized membrane according to another embodiment of the present invention. More specifically, this process 400 provides a method for producing a metal-impregnated polymer membrane. In a first step 410, a polymer membrane is soaked in a solution containing a reducible metal salt comprising the metal to be impregnated into the membrane. The selection of the reducible metal salt may also dictate the type of solvent that is used in creating the solution comprising the reducible metal salt. If the metal salt is an anionic complex, then it would not permeate a cationic exchange membrane because of its anionic sites, such as the sulfonic acid sites in NAFION®. For such cases, a solvent that minimizes dissociation of the metal salt should be used so that greater penetration of the metal salt in an undissociated form is achieved. In one embodiment, to produce a gold-impregnated polymer membrane, the NAFION® membrane is soaked for approximately one hour in an acetonitrile solution containing approximately 50 mM AuCl at room temperature. In another embodiment, to produce a gold-impregnated polymer membrane, the NAFION® membrane is soaked for approximately one hour in a methanol solution containing approximately 50 mM HAuCl$_4$ at room temperature.

In a second step 420, the polymer membrane is removed from the chemical solution used in the first step 410 and optionally cleaned. The cleaning of the membrane may comprise wiping, rinsing, blowing, or any other means known in the art to remove excess solution from the first step 410. Some care should be exercised in the chemical removal and cleaning as to not introduce other gross contaminants, such as lint or dust.

In a third step 430, the polymer membrane is soaked in a reducing agent. The selection of the reducing agent depends on the chemistry of the solution containing the reducible metal salt that was used in the first step 410 and the composition of the polymer membrane. Generally, the polymer membrane is exposed to the reducing agent for a period of time that is relatively short, such as 10-30 minutes, as compared to the amount of time required to permeate the reducing solution through the membrane in the process 300 described in connection with FIG. 3.

In one embodiment for producing a gold-impregnated polymer membrane through the use of the AuCl-acetonitrile solution, the NAFION® membrane is soaked in a solution of approximately 0.02 M hydrazine, which acts as the reducing agent. Generally, this embodiment produces a black, opaque membrane with colloidal gold particles dispersed within the membrane. In another embodiment for producing a gold-impregnated polymer membrane through the use of the $HAuCl_4$-methanol solution, the NAFION® membrane is soaked for about 30 minutes in a solution of approximately 0.1 M sodium borohydride ($NaBH_4$) and approximately 0.1 M sodium hydroxide (NaOH). As known in the art, sodium hydroxide may be substituted by potassium hydroxide. Typically, this embodiment yields a pinkish transparent or translucent membrane with gold nanoparticles dispersed throughout the membrane.

In a final step 440, the membrane is either removed from the reducing agent solution or the solution is discharged from a container in which the membrane is soaking. At this point, the membrane is ready for use.

It should be appreciated that the process 400 described above in FIG. 4 can be further varied to form other types of metal-impregnated membranes by using different reducible metal salts, solvents, reducing agents, polymer membrane and process conditions. For example, to form a palladium-impregnated NAFION® membrane, the NAFION® membrane may be soaked for approximately 30 minutes in an approximately 0.113 M palladium chloride ($PdCl_2$) solution at approximately 90° C. in the first step 410, washed in water in the second step 420, and soaked in an approximately 0.2 M hydrazine solution for 15 minutes in the third step 430, which is then followed by another thorough water rinse. The resulting palladium-impregnated NAFION® membrane is a dark membrane. By varying the reducible metal salts, solvents, reducing agents, polymer membrane and process conditions, especially temperature and exposure time, the degree of metal impregnation into the membrane, both in terms of concentration of the metal in the membrane and the extent of dispersion from one side of the membrane to the other, may be varied.

Figure 5:
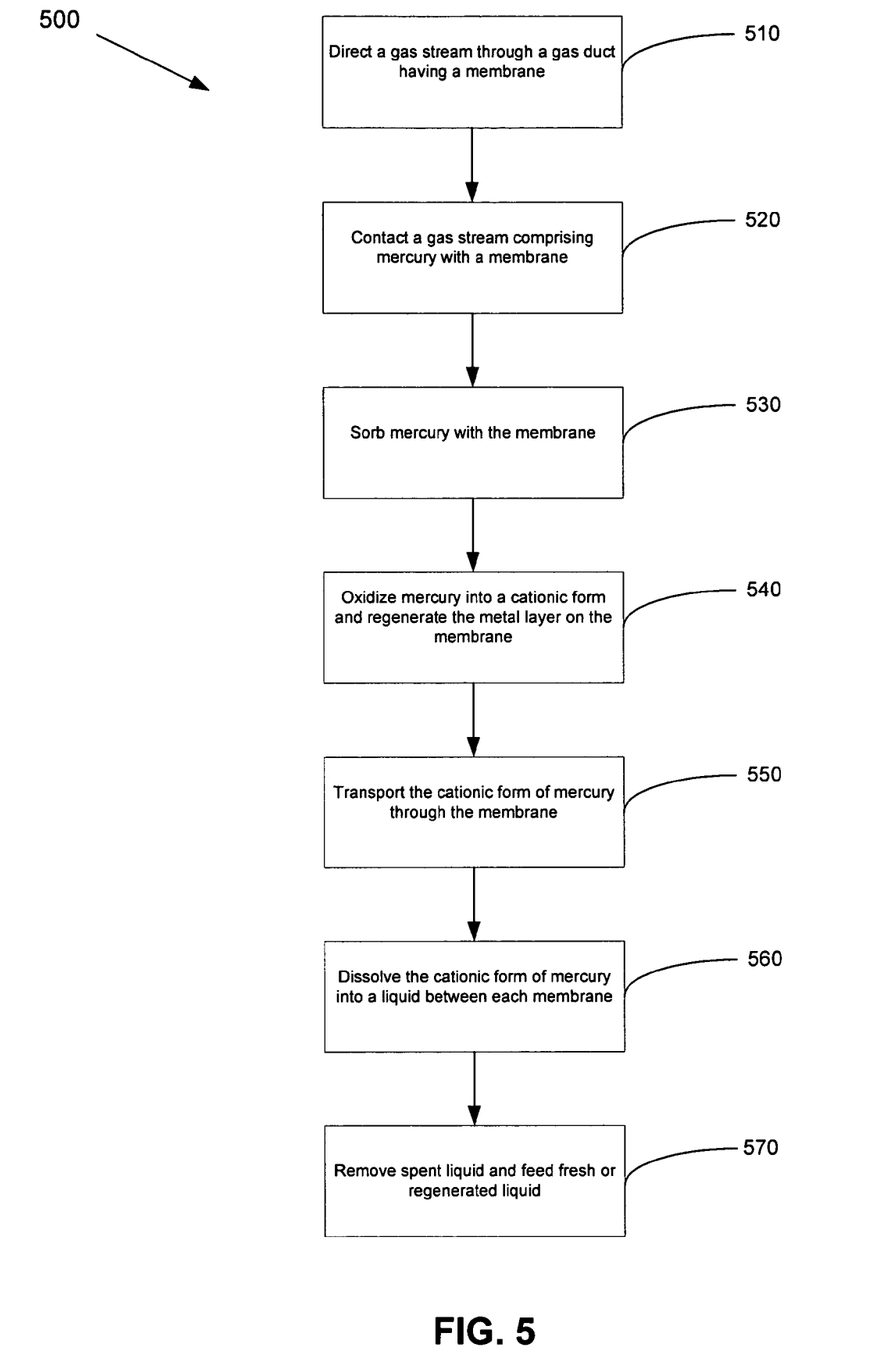
FIG. 5 is a flowchart of a method of vapor phase contaminant removal according to one embodiment of the present invention.

FIG. 5 is a flowchart of a method of vapor phase contaminant removal according to one embodiment of the present invention. This method 500 is generally a method for removing a vapor phase contaminant, such as mercury, from a gas stream, such as a flue gas stream comprising vapor phase contaminants such as, but not limited to, Hg, $NO_x$ and $SO_x$ that have been generated by a coal-fired power plant boiler, using any of the embodiments of the membrane removal system described above. Moreover, it should be appreciated that the membrane removal system of the present invention may be capable of removing more than one vapor phase contaminant and may remove Hg, $NO_x$ and $SO_x$ together or in any combination. Therefore, it should be appreciated that the present invention is not limited to the removal of mercury from a flue gas stream and may be used to remove other vapor phase contaminants in the same or in other types of gas streams. Regardless, the following method is discussed in the context of mercury removal from flue gas generated by a coal-fired power plant boiler; however, this description should not be deemed limiting as to the application of the method to other vapor phase contaminants.

In a first step 510, a flue gas stream comprising mercury is directed through a duct in which is placed a membrane removal system according to any of the embodiments described herein. In a second step 520, the flue gas flows past the membrane removal system, thereby contacting the surface of each membrane in each membrane unit in the membrane removal system. In one embodiment for use in removing mercury, the flue gas may contact a bare membrane made of perfluorinated polymer containing sulfonic acid groups such as NAFION®. In another embodiment of the present invention, the flue gas stream may contact a metallized membrane, in which the metallized membrane comprises a polymer membrane, such as NAFION®, and a metal layer on the surface of the polymer membrane, where the metal layer may be gold. In yet another embodiment, the flue gas may contact a metal-impregnated polymer membrane, which may also comprise gold for use in mercury removal.

Again, it should be appreciated that depending upon the vapor phase contaminant to be removed, different membranes and different types of metal for metallized membranes may be used or different compounds or species, such as carbon. For example, in removing sulfur oxides, such as sulfur dioxide, a membrane having either a ferric ion- or manganese ion-based metal layer and/or having ferric ion or manganese ion dispersed within the membrane may be used for oxidizing the sulfur oxide. In removing NO, a membrane having either a reducing agent such as dichromate or permanganate on or in the membrane may be used, or a complexing/reducing agent such as ferrous ethylenediaminetetraacetic acid (ferrous EDTA) on or in the membrane may be used. It should be appreciated that membranes having a combination of the metals and/or metal ions, for example, combinations of any of the metals and metal ions described herein, may be used, including a combination of metals and metal ions used in removing different vapor phase contaminants.

In a third step 530, the vapor phase contaminant in the flue gas contacts and is sorbed by the membrane. It should be appreciated that the sorption of the vapor phase contaminant may occur on the membrane's outer surface or the sorption may be below the outer surface of the membrane such that the vapor phase contaminant is sorbed into the membrane. In connection with the sorption of mercury, it should be appreciated that non-metallized NAFION® may be relatively effective in sorbing mercury because the sulfonic acid sites in the membrane can complex mercury ions, which further facilitates mercury oxidation. For more effective mercury sorption, a gold metallized membrane (either a membrane having a gold layer or a gold-impregnated membrane) may be used since mercury has a high affinity for gold and because gold has the ability to collect all forms of mercury including elemental mercury, which is generally difficult to capture. Moreover, gold can be easily applied to a variety of membrane substrates. During the sorption process, the sorbed mercury may amalgamate with the gold on the membrane surface to form amalgamated mercury.

In a fourth step 540, the sorbed vapor phase contaminant may be reacted to a more desired or reacted form, preferably one that is easily dissolved in the liquid in contact with the opposite side of the membrane. For example, sorbed mercury or amalgamated mercury on the membrane can be oxidized to an oxidized form of mercury by the oxygen present in the flue gas. This oxidation may be catalyzed by the membrane material itself, such as NAFION®, and, in the case of a metallized membrane, by the metal on the membrane surface and/or by the metal present within the membrane. More specifically, elemental mercury, $Hg^0$, may oxidize to a cationic form of mercury, such as $Hg^{2+}$, and this oxidation can be catalyzed by the metal, such a gold, that is present on and in the membrane. It should be appreciated that different chemical reactions may be caused to occur, thereby chemically altering the form of a given sorbed vapor phase contaminant to further facilitate its removal from the membrane unit. For example, it may be desirable to chemically alter the form of a sorbed vapor phase contaminant to facilitate its transport through the membrane or to enhance its solubility in the liquid that flows between each pair of membranes in a membrane unit, thereby increasing the rate at which it is removed from the membrane. The composition of the membrane, the metal added to the membrane and the liquid, which will be further described, and possibly the composition of the gas stream being treated (e.g., by the presence of oxygen or other gaseous species), can be varied so that a given sorbed vapor phase contaminant can be reacted to produce a desired chemical form that facilitates its removal. For example, in connection with the removal of sulfur dioxide, the sorbed sulfur dioxide may be oxidized to form sulfuric acid or sulfite and sulfate ions, which are readily dissolvable in water, any aqueous solution, or an alkaline solution. Similarly, sorbed nitrogen oxides may be reduced to form nitric acid, which is also readily soluble in water, any aqueous solution, or an alkaline solution. As noted, in removing sulfur oxides, such as sulfur dioxide, a membrane having either a ferric ion- or manganese ion-based metal layer and/or having ferric ion or manganese ion dispersed within the membrane may be used to oxidize the sorbed sulfur oxide. In removing NO, a membrane having either a reducing agent such as dichromate or permanganate on or in the membrane may be used, or a complexing/reducing agent such as ferrous ethylenediaminetetraacetic acid (ferrous EDTA) on or in the membrane may be used. It should be appreciated that membranes having a combination of the metals and/or metal ions, for example, combinations of any of the metals and metal ions described herein, may be used, including a combination of metals and metal ions used in removing different vapor phase contaminants.

It should be appreciated that the liquid that flows between each pair of membranes in a membrane unit, which is discussed in more detail below in connection with removing the sorbed vapor phase contaminant from the membrane unit, may also assist in chemically converting the sorbed vapor phase contaminant into a more desired form. For example, the liquid between each pair of membranes may permeate at least partially or completely into the membrane thereby coming in contact with the sorbed vapor phase contaminant. For example, if this liquid has the ability to oxidize, it may oxidize the sorbed vapor phase contaminant, thereby providing additional oxidizing capacity in combination with the catalytic facility provided by the membrane and metal as described above and the oxygen present in the flue gas. It should be appreciated that in the case where the liquid fully permeates the membrane, that some evaporation of the liquid may occur. Therefore, liquid make-up may be necessary to the region between the membranes.

In the case of mercury removal, any suitable liquid can be used, as long as it can oxidize mercury. For example, ferric chloride, potassium permanganate and hydrogen peroxide are suitable oxidizing liquids. In one embodiment, nitric acid may be used as the oxidizing liquid. Additionally, the oxidizing liquid may be combined with a complexing agent for oxidized mercury, such as $Hg^{2+}$, which may further facilitate the transport and removal of the mercury from the membrane. Such complexing agents may include chlorides, ethylenediaminetetraacetic acid (EDTA), iodide and sulfur or sulfur compounds, such as ones containing sulfides or alkylthiol. In the case of the removal of sulfur oxides or nitrogen oxides, water, any aqueous solution, or any alkaline solution may provide a suitable liquid for use between the membranes for dissolving the sorbed vapor phase contaminant or its chemically altered form.

Further, in the case of mercury removal, as a result of oxidizing the amalgamated mercury, the gold metal is regenerated. Without being limited to theory, it is believed that once the mercury is oxidized or converted into a cationic form, it is released by the gold metal for transport through the membrane, thereby regenerating the gold in the metal layer.

In a fifth step 550, the sorbed vapor phase contaminant, or its reacted or chemically altered form, is transported through the membrane to the side that is in contact with the liquid that flows between each pair of membranes in a membrane unit. As noted above, the membrane composition and its thickness should be conducive to the transporting and diffusion of the sorbed vapor phase contaminant or its chemically altered form, such as cationic mercury. For example, the membrane should be sufficiently permeable to handle cationic mercury. Further, a membrane that is too thick may impede the movement of cationic mercury within the membrane. On the other hand, a membrane that is too thin may be suitable for transporting of cationic mercury but may be mechanically weaker and degrade faster over time, thereby requiring more frequent replacement. In one embodiment, a NAFION® membrane having a thickness of approximately 0.2 mm provides sufficient molecular movement or diffusion through the membrane and good mechanical or structural integrity.

In a sixth step 560, the sorbed vapor phase contaminant, or its chemically altered form, is dissolved or absorbed into the liquid that flows between each pair of membranes in a membrane unit. It should be appreciated that the contaminant or its chemically altered form may actually be dissolved or absorbed into the liquid after it has been transported through the membrane, or it may be dissolved or absorbed into liquid that has permeated the membrane. Once the sorbed contaminant or its chemically altered form is present in this liquid, it can be transported out of the membrane unit and membrane removal system and out of the duct.

A variety of chemicals may be used as the liquid that flows between each pair of membranes, and the choice depends on the type of vapor phase contaminant to be removed, the polymer membrane material, the metal used in conjunction with the membrane and its regenerability and the desired removal rate of the vapor phase contaminant. Generally, the liquid should be capable of dissolving or absorbing the vapor phase contaminant or its chemically altered form, so that the vapor phase contaminant may be removed from the metallized membrane surface and subsequently from the membrane removal system and the gas duct. In addition, chemical compatibility and concentration of the liquid needs to be considered with respect to the polymer membrane material and any metal used in conjunction with the membrane to minimize or avoid any degradation of the membrane. Generally, the liquid will be water-based, although non-aqueous solvents may be applied, such as propylene carbonate.

It should be appreciated that the liquid may comprise a solution having various chemical species that assist in chemically converting a sorbed contaminant to a more desired form. For example, the liquid may contain species that facilitate oxidation of the sorbed contaminant to an oxidized form, a cationic form or an anionic form. In this case, the selection of an oxidizing liquid may be based upon the oxidation potential of the sorbed contaminant. Alternatively, if a metal is used in conjunction with the membrane that provides sufficient catalysis for oxidation by other system components, the liquid may not need to be capable of oxidizing the sorbed contaminant. Examples of suitable chemicals for use in a water-based solution for this liquid include nitric acid, ferric chloride, ferric citrate, ferric thiocyanate, ferric nitrate, a combination of ferric chloride and sodium citrate, potassium permanganate, potassium iodide, iodine, a combination of potassium iodide and iodine, a combination of potassium iodide, iodine and propylene carbonate, methylene blue, polyaniline, hydrogen peroxide and hypochlorite. Water by itself may also be a suitable liquid for this step. Furthermore, potassium- and sodium-based compounds with the same anionic species are often interchangeable with one another. For example potassium iodide can be substituted for sodium iodide and vice versa. In the case of mercury removal, preferred embodiments of the liquid include nitric acid, a nitric acid solution with a complexing agent for oxidized mercury such as $Hg^{2+}$, and ferric chloride. Suitable complexing agents for oxidized mercury include chlorides, ethylenediaminetetraacetic acid (EDTA), iodide and sulfur or sulfur compounds, such as ones containing sulfides or alkylthiol. In the case of the removal of sulfur oxides or nitrogen oxides, water, any aqueous solution, or any alkaline solution may provide a suitable liquid for use between the membranes for dissolving the sorbed vapor phase contaminant or its chemically altered form.

Since the liquid affects removal of the vapor phase contaminant, and may affect any reaction of the sorbed contaminant to form a more desired form, as well as the regeneration of any metal used in conjunction with the membrane, the membrane unit should be constructed to either provide a sufficient volume of liquid between each pair of membranes or a sufficient flow of fresh liquid between the membranes. Generally, the distance between a pair of membranes may be approximately 1-3 centimeters or less. Regardless of the volume between each pair of membranes, the flow rate of the liquid through this region may also be optimized to provide enough driving force for the dissolution or absorption of the sorbed contaminant or its chemically altered form into the liquid, as discussed below.

In the seventh step 570, the liquid between the membranes is removed from the membrane units in the membrane removal system and either fresh or regenerated liquid is fed to the membrane units. This may be accomplished using a recirculation system wherein the liquid being removed from the membrane units (spent liquid) is sent to a regeneration system where the sorbed contaminant is removed from the liquid and the liquid is regenerated and returned to the membrane units on a continuous basis. The spent liquid may be regenerated by oxidation or other chemical or electrochemical process that restores the liquid's ability to dissolve the sorbed contaminant.

Alternatively, spent liquid may simply be discharged from the membrane units, and fresh liquid may be fed to the membrane units on a continuous or semi-continuous basis depending upon the removal rate of the contaminant(s) from the gas. Alternatively, the liquid may be discharged and fresh liquid fed to the membrane units batch-wise in intervals dictated by the need for fresh liquid, which would depend upon the amount of vapor phase contaminant absorbed by the liquid and the capacity of the liquid for that contaminant. In yet another embodiment, the membrane units may be constructed such that the liquid is not removable from between the membranes and once spent, the entire membrane unit may simply be replaced.

Having described the process generally for use of the membrane removal system for the removal of vapor phase contaminants, it should be appreciated that in the context of mercury removal from the flue gas of a coal-fired boiler, it is desirable to utilize metallized membranes made of a perfluorinated polymer with sulfonic acid groups, such as NAFION®, wherein the metal comprises a gold metal layer or gold particles impregnating the membrane. The liquid between the metallized membranes may be a solution of nitric acid, a nitric acid solution with a complexing agent for oxidized mercury, a solution of ferric chloride, a solution of ferric thiocyanate, or a solution of ferric citrate. In addition, the liquid between a gold-impregnated polymer membrane may also be water.

The following Examples are provided as illustrative only and are not intended to limit to the scope of the invention.

EXAMPLE 1

Bench-scale experiments were performed using metallized NAFION® 117 membranes and a non-metallized NAFION® 117 membranes, which is a 0.007-inch thick clear plastic sheet with good mechanical properties. The metallized membranes further comprised a gold-layered membrane and a gold-impregnated membrane, which included both colloidal gold particles and gold nanoparticle varieties. For comparison, bench-scale experiments were also performed using a gold-plated 18 gauge stainless steel screen.

Simulated flue gas contacted one side of each membrane, and liquid was present on the opposite side of the membrane. The flue gas flow rate was 1.0 L/minute, which produced a linear velocity of 1.4 ft/sec flue gas across the membrane surface. The liquid flowed continuously over the wet side of the membrane at a flow rate of 1.34 mL/minute using a peristaltic pump. The reactor and liquid were kept in an insulated and thermostatted oven maintained at 130° F. The tests lasted between 20 to 40 hours.

The simulated flue gas composition comprised a mixture of nominally 400 ppm $SO_2$, 200 ppm $NO_x$, 2 ppm HCl, 6% $O_2$, 12% $CO_2$, 7% $H_2O$, balance $N_2$. Moisture was added to the reaction gas by flowing a known volume of nitrogen gas through a temperature-controlled saturator. Mercury was added to the gas by flowing a nitrogen carrier stream through a temperature-controlled permeation chamber containing elemental mercury. The nominal inlet mercury concentration was 37 microgram/$Nm^3$. The gases, water vapor, and nitrogen stream containing mercury were mixed in a mixing tube and directed to the membrane.

During each test mercury concentrations were measured. To ensure accurate measurements, the reactor outlet gas stream was sent through a liquid gas conditioning system before reaching the analytical system to remove the acid gases from the gas stream and to convert all of the mercury species to an elemental form. Gas phase mercury was then measured semi-continuously using a gold amalgamation unit followed by the CVAA (cold-vapor atomic absorption) unit. Inlet mercury concentrations were measured before and after each test, and outlet concentrations were monitored during each test.

Table 1 summarizes the results of these experiments.

TABLE 1

| Membrane | Liquid | Time (hours) | Maximum Hg⁰ Absorption (% of inlet $Hg^0$) | Average $Hg^0$ Absorption (% of inlet $Hg^0$) | $SO_2$* Removal (mM sulfate) |
|---|---|---|---|---|---|
| Gold-layered NAFION® | 2.0 M nitric acid | 21.7 | 85 | 60 | 6.5 |
| Colloidal gold-impregnated NAFION® | 2.0 M nitric acid | 21.7 | 83 | 60 | 6.9 |
| Nano-particle gold-impregnated NAFION® | water | 40 | 40 | 30 | — |
| Bare NAFION® | 2.0 M nitric acid | 21.7 | 35 | 15 | 1.6 |
| Gold-plated 18 gauge stainless steel screen | 2.0 M nitric acid | 20 | 34 | 7.8 | — |

*SO2 removal is indicated by the presence of sulfate as measured in the liquid.

EXAMPLE 2

Additional experiments on NAFION® membranes were performed under conditions similar to Example 1, to evaluate various liquids. Table 2 summarizes the results of these experiments.

TABLE 2

Elemental mercury absorption by Nafion 117 (except as noted) with different liquids.

| Liquid | Average $Hg^0$ Absorption (%) |
|---|---|
| $H_2O$ | 6.3 |
| 2.0 M $HNO_3$ | 15.0 |
| 1.0 M Ferric Chloride | 23.0 |
| 1.0 M Ferric Nitrate | 0.0 |
| 0.1 M $FeCl_3$ + 0.2 M $Na_3$ Citrate | 14.0 |
| 0.5 M Potassium Ferricyanide | 1.2 |
| 0.05 M Methylene Blue | 4.6 |
| 1.0 M KI + 0.1 M $I_2$ | 69.0 |
| 1.0 M KI + 0.02 M $I_2$ | 55.0 |
| 1.0 M KI + 0.02 M $I_2$ with 0.09 mm Nafion | 27.0 |
| 5.0 M KI + 0.05 M $I_2$ | 47.5 |
| 0.625 M KI + 0.0625 M $I_2$ in $H_2O$-saturated propylene carbonate | 16.2 |

While the foregoing description represent various embodiments of the present invention, it should be appreciated that the foregoing description should not be deemed limiting since additions, variations, modifications and substitutions may be made without departing from the spirit and scope of the present invention. It will be clear to one of skill in the art that the present invention may be embodied in other forms, structures, arrangements, and proportions and may use other elements, materials and components. For example, although the method is described in connection with the removal of mercury from a flue gas stream, the method can be adapted for the removal of other vapor phase contaminants by varying the polymer membrane composition, the metal used in conjunction with the membrane, and the composition of the liquid that is used between each pair of membranes. Moreover, it should be appreciated that different membrane units comprising different membranes or metallized membranes and different liquids may be used together in the same membrane removal system to remove more than one type of vapor phase contaminant. The present disclosed embodiments are, therefore, to be considered in all respects as illustrative and not restrictive, the scope of the invention being indicated by the appended claims and not limited to the foregoing description.

What is claimed is:

1. A method for removing a vapor phase contaminant from a gas stream, comprising:
    contacting a gas stream comprising a vapor phase contaminant selected from the group consisting of elemental mercury, sulfur dioxide, and NO, with a first side of a membrane;
    sorbing said vapor phase contaminant using said membrane;
    reacting said vapor phase contaminant into a reacted form of said vapor phase contaminant;
    transporting said reacted form of said vapor phase contaminant through said membrane to a second side of said membrane;
    contacting said second side of said membrane with a liquid; and
    dissolving said reacted form of said vapor phase contaminant into said liquid.

2. The method of claim 1, wherein said vapor phase contaminant comprises elemental mercury, wherein said reacting comprises oxidizing said elemental mercury into an oxidized form, and wherein said reacted form is said oxidized form.

3. The method of claim 2, further comprising catalyzing said oxidizing of said elemental mercury into a cationic form.

4. The method of claim 3, wherein said catalyzing comprises catalyzing said oxidizing of said elemental mercury into said cationic form using a metal and wherein said membrane comprises a metallized membrane comprising said metal.

5. The method of claim 4, wherein said metal comprises gold.

6. The method of claim 4, wherein said metal comprises palladium.

7. The method of claim 4, wherein said metal is selected from a group consisting of gold, silver, palladium, platinum, copper, nickel and mixtures thereof.

8. The method of claim 4, wherein said metal is disposed on said metallized membrane as a metal layer.

9. The method of claim 4, wherein said metal is in a particulate form and is disposed within a portion of said metallized membrane.

10. The method of claim 3, wherein said catalyzing comprises catalyzing said oxidizing of said elemental mercury into said cationic form using a Group VI element and wherein said membrane comprises said Group VI element.

11. The method of claim 10, wherein said Group VI element is selenium.

12. The method of claim 2, wherein said liquid comprises an oxidizing liquid.

13. The method of claim 12, wherein said oxidizing liquid comprises nitric acid.

14. The method of claim 12, wherein said oxidizing liquid comprises a complexing agent for oxidized mercury.

15. The method of claim 12, wherein said oxidizing liquid comprises ferric chloride.

16. The method of claim 12, wherein said oxidizing liquid comprises at least one component selected from a group consisting of nitric acid, a complexing agent for oxidized mercury, ferric chloride, ferric citrate, ferric thiocyanate, ferric nitrale, sodium citrate, potassium permanganate, potassium iodide, iodine, propylene carbonate, methylene blue, hypochiorite, polyaniline and hydrogen peroxide.

17. The method of claim 12, further comprising regenerating said oxidizing liquid after said oxidizing.

18. The method of claim 1, wherein said liquid comprises an aqueous solution.

19. The method of claim 1, wherein said membrane comprises a polymer.

20. The method of claim 19, wherein said polymer comprises a perfluorinated polymer.

21. The method of claim 20, wherein said perfluorinated polymer further comprises an anionic group.

22. The method of claim 21, wherein said anionic group comprises sulfonic acid groups.

23. The method of claim 1, wherein said membrane comprises a polymer and a metal and further comprising:

catalyzing said oxidizing using said metal; and
regenerating said metal after said catalyzing.

24. The method of claim 1, wherein said vapor phase contaminant comprises sulfur dioxide, wherein said reacting comprises oxidizing said sulfur dioxide into an oxidized form, and wherein said reacted form is said oxidized form.

25. The method of claim 24, further comprising catalyzing said oxidizing of said sulfur dioxide.

26. The method of claim 25, wherein said catalyzing comprises catalyzing said oxidizing of said sulfur dioxide using a metal and wherein said membrane comprises a metallized membrane comprising said metal.

27. The method of claim 1, wherein said vapor phase contaminant comprises NO, wherein said reacting comprises reducing said NO into a reduced form, and wherein said reacted form is said reduced form.

28. The method of claim 27, further comprising catalyzing said reducing of said NO.

* * * * *